(12) United States Patent
Brown et al.

(10) Patent No.: US 8,499,643 B2
(45) Date of Patent: Aug. 6, 2013

(54) IN-SITU SENSORS AND METHODS FOR MONITORING ENVIRONMENT ASSISTED CRACKING OF STRUCTURAL COMPONENTS

(75) Inventors: Nathan K. Brown, Palmyra, VA (US); Fritz J. Friedersdorf, Earlysville, VA (US)

(73) Assignee: Luna Innovations Incorporated, Roanoke, VA (US)

(*) Notice: Subject to any disclaimer, the term of this patent is extended or adjusted under 35 U.S.C. 154(b) by 263 days.

(21) Appl. No.: 12/912,465

(22) Filed: Oct. 26, 2010

(65) Prior Publication Data
US 2011/0100131 A1    May 5, 2011

Related U.S. Application Data

(60) Provisional application No. 61/272,769, filed on Oct. 30, 2009.

(51) Int. Cl.
*F16B 31/02* (2006.01)

(52) U.S. Cl.
USPC .......................................................... 73/761

(58) Field of Classification Search
USPC .................................. 73/761, 820, 762, 760
See application file for complete search history.

(56) References Cited

U.S. PATENT DOCUMENTS

| | | | |
|---|---|---|---|
| 3,034,340 A | | 5/1962 | Jankowsky et al. |
| 4,554,838 A | * | 11/1985 | Paus .................................. 73/761 |
| 4,899,591 A | * | 2/1990 | Kibblewhite ...................... 73/761 |
| 7,387,031 B1 | | 6/2008 | Perrin et al. |

OTHER PUBLICATIONS

Ibrahim et al, "Validity of a new fracture mechanics technique for the determination of the threshold stress intensity factor for stress corrosion cracking ($K_{iscc}$) and crack growth rate of engineering materials," Engineering Fracture Mechanics 75, 2008, pp. 1623-1634.
C.T. Fujii, "Stress-Corrosion Cracking Properties of 17-4 PH Steel," ASTM International, 1976, pp. 213-225.

\* cited by examiner

*Primary Examiner* — Lisa Caputo
*Assistant Examiner* — Octavia D. Hollington
(74) *Attorney, Agent, or Firm* — Nixon & Vanderhye P.C.

(57) ABSTRACT

Sensor assemblies, units and methods are provided to determine crack development of components of interest associated with a monitored structure. According to preferred embodiments, a sample sensor bolt is provided having a shank with a threaded end, the sensor bolt being formed of a material serving as a surrogate of the material forming a component of interest associated with the monitored structure. A frame surrounds the shank of the sensor bolt and has fluid ports therein to allow fluid to contact an exposed portion of the sensor bolt shank in registry therewith. A load cell is operatively connected to the sensor bolt. A preload nut is threaded onto the threaded end of the sensor bolt shank and contacts an end of the frame so as to place the sensor bolt under an initial tensile stress. Crack formation within the sensor bolt shank caused by fluid acting upon the exposed portion thereof responsively relieves the initial tensile stress of the sensor bolt which is thereby sensed by the load cell, whereby crack formation in the shank can be used to sense the propensity for crack development in the component of interest associated with the monitored structure.

20 Claims, 6 Drawing Sheets

IN-SITU SENSORS AND METHODS FOR MONITORING ENVIRONMENT ASSISTED CRACKING OF STRUCTURAL COMPONENTS

CROSS-REFERENCE TO RELATED APPLICATION

This application is based on and claims priority benefits under 35 USC §119(e) from U.S. Provisional Application Ser. No. 61/272,769 filed on Oct. 30, 2009, the entire content of which is expressly incorporated hereinto by reference.

TECHNICAL FIELD

The technology described herein relates generally to the technical field of physical sensors. More specifically, the technology described herein is in the technical field of structural health monitoring sensors.

BACKGROUND

Environment assisted cracking (EAC) has long been recognized as a major cause of component and structural failures, but the basic mechanisms of this process are still not fully understood. EAC includes hydrogen embrittlement (HE) and stress corrosion cracking (SCC) and other forms of metal and alloy cracking caused by the combined action of stress and environment. The development of standardized and practicable methods of testing and monitoring these degradation mechanisms is critical to understanding the kinetics of such failures and also to provide maintainers with an indication of operating conditions that have the potential to produce EAC in their systems.

One proposed mechanism of EAC is hydrogen embrittlement (HE), which is the process by which various metals, such as high-strength alloys, lose ductility and crack due to exposure to hydrogen. The process is associated with hydrogen uptake in the alloy, which can be initiated by atomic hydrogen produced by electrochemical processes. The hydrogen atoms affect the ductility of the alloy and promote the propagation of transgranular and intergranular cracks with reduced overall elongation to failure. The combination of atomic hydrogen, alloy properties, and applied stress can result in embrittlement and crack propagation. A wide range of metals and alloys are susceptible to HE, including high-strength low-alloy steels and nickel based materials.

Hydrogen embrittlement can occur during various manufacturing operations or operational uses, i.e. anywhere that the metal comes into contact with atomic or molecular hydrogen. Processes that can lead to HE include cathodic protection, phosphating, pickling, and electroplating. Other mechanisms of hydrogen introduction into metal are corrosion, chemical reactions of metal with acids, or with other chemicals, notably hydrogen sulfide in sulfide stress cracking, a process of importance for the oil and gas industries.

There are two ASTM standards for testing embrittlement due to hydrogen gas. The standard ASTM F1459-06 Standard Test Method for Determination of the Susceptibility of Metallic Materials to Hydrogen Gas Embrittlement (HE) Test[1] uses a diaphragm loaded with differential pressure. The test ASTM G142-98 (2004) Standard Test Method for Determination of Susceptibility of Metals to Embrittlement in Hydrogen Containing Environments at High Pressure, High Pressure, High Temperature, or Both uses a cylindrical tensile specimen tested in an enclosure pressurized with hydrogen or helium.

[1] This and all other referenced publications below are expressly incorporated by reference herein.

Another ASTM standard exists for quantitatively testing for the Hydrogen Embrittlement threshold stress for the onset of Hydrogen-Induced Cracking due to platings and coatings from Internal Hydrogen Embrittlement (IHM) and Environmental Hydrogen Embrittlement (EHE) [1]—ASTM F1624-06 Standard Test Method for Measurement of Hydrogen Embrittlement Threshold in Steel by the Incremental Step Loading Technique.

The main interest of the environment assisted cracking detection system is for monitoring high-strength fasteners and structures that may be susceptible to HE under non-ideal cathodic protection conditions. Available hydrogen, in conjunction with high tensile loads and local stress risers that are characteristic of typical bolting applications (e.g., threads, surface imperfections), can result in EAC and subsequent fastener failure that has significant safety and availability implications for a variety of marine structures such as ships, oil and gas platforms, and pipelines. An in situ EAC sensing device would therefore provide valuable early warning capability, alerting users to environmental conditions that are prerequisite to cracking within the monitored structure.

Conventional in situ EAC sensing methods approach the problem in various ways. Of these, the methods involving the sensing of mechanical strain relief under cracking conditions are of particular interest. As one example, U.S. Pat. No. 3,034,340 to Jankowsky et al has proposed fracture specimens from sections of pipe, known as c-rings, to produce a large tensile stress in a notched region when loaded with an instrumented bolt. Crack initiation and propagation in the notched region tends to relax the initial bolt load, and thus is measureable by monitoring the load (strain) within the bolt member. Another prior proposal in U.S. Pat. No. 7,387,031 to Perrin et al includes a similar approach where strain gage instrumented flat strips of metal are deformed and held in a U-shape. Material loss caused by corrosion, erosion, pitting, and cracking are detrimental to the stiffness of the metal sample, thereby resulting in a deflection that is observed by the strain gage instrumentation.

In order to reduce the equipment burden, permit field deployment, and reduce costs, it is an objective of the technology described herein to produce a compact device that can supply the necessary stress to induce sample failure under approximate plane-strain conditions. The sample arrangement chosen for the current design is the circumferential notched tensile (CNT) geometry. As described in Ibrahim, R. N., et al. "*Validity of a new fracture mechanics technique for the determination of the threshold stress intensity factor for stress corrosion cracking ($K_{ISCC}$) and crack growth rate of engineering materials*", Engineering Fracture Mechanics 75 (2008) 1623-1634, the CNT geometry is the smallest possible geometry that can produce approximate plane-strain crack loading conditions, within 3% of the ASTM compact tension (CT) specimens. To produce valid plane-strain conditions, the sample dimensions must be sufficient to constrain the plastic zone ahead of the crack tip. The CNT specimen can be made smaller thanks to its continuous circumferential notch, which affords a highly constrained plastic zone. The CT specimen, on the other hand, must be much thicker to ensure that the plane stress conditions at the free surfaces are small compared to the plane strain region in the interior of the specimen. For example, acceptable results have been obtained with 9.5 mm and 15 mm CNT specimens for materials that required CT specimen dimensions up to 80 mm.

Application of conventional monitoring and warning systems throughout the flooded or wetted spaces of a vessel or other structure would be complex, expensive, heavy, and vulnerable to damage. There is a current need for a simple monitoring system that can be used in the vicinity of critical high strength components to indicate the cumulative impact of conditions that can lead to EAC and premature failure. The problem of monitoring for conditions leading to EAC, in particular HE is solved according to the technology disclosed herein by utilizing a small CNT specimen in conjunction with very stiff sensor construction and highly sensitive strain gage instrumentation to provide high resolution crack depth measurement on the surrogate sample.

The technology described herein is embodied in novel sensors and methods for detecting the presence of conditions that would lead to environment assisted cracking (EAC) within structural components. According to certain embodiments, a sensor is provided which contains a material sample of similar composition to the monitored structure and is placed under a tensile preload that mimics the loading experienced by the monitored structure. Cracking within this surrogate sample correlates to damage in the monitored structure. The crack depth measurement is made by comparing the real-time tensile force on the sample to its initial value. Cracking in the sample increases its compliance and causes the load to drop in a predictable manner. The sensor design embodied by the technology described herein combines a very compact geometry with high-resolution crack depth measurement at a low cost, thereby making it very well suited for field installations, especially for alloys and conditions that have very low crack velocities that would normally go undetected.

Certain embodiments of the invention have the ability to monitor the initiation and progression of cracks in a tensile specimen with high resolution while in a small, ruggedized package, not requiring a large load frame or costly instrumentation. Additionally these devices are not susceptible to changes in fluid conductivity that can confound crack depth measurement techniques based on sample electrical conductivity. One principal design consideration that permits the high-resolution crack depth sensing is the high mechanical stiffness of both the sample and loading frame that enhances the load drop (sensed parameter) with crack growth. The sensor device according to embodiments of the invention is applicable both to real-time condition monitoring of a structure (e.g. underwater pipeline fasteners under cathodic protection) as well as laboratory characterization of the EAC susceptibility of materials, particularly during alloy development when a large number of tests are required for extended periods.

According to preferred embodiments, a sensor unit provides surrogate determination of crack development within a component of interest associated with a monitored structure. The sensor unit most preferably includes a sample sensor bolt having a shank with a threaded end. The shank of the sensor bolt is formed of a material serving as a surrogate of the material forming the component of interest associated with the monitored structure. A frame surrounds the shank of the sensor bolt and has fluid ports therein to allow fluid to contact an exposed portion of the sensor bolt shank in registry therewith. A load cell is operatively connected to the sensor bolt. A pre-load nut is threaded onto the threaded end of the sensor bolt shank and contacting an end of the frame so as to place the sensor bolt under an initial tensile stress. Crack formation within the sensor bolt shank caused by fluid acting upon the exposed portion thereof responsively relieves the initial tensile stress of the sensor bolt which is thereby sensed by the load cell. In such a manner, the crack development occurring in the sensor bolt shank may be determined and correlated to crack development occurring within the component of interest associated with the monitored structure.

These and other aspects of the present invention will become more clear after careful attention is given to the following detailed description of the preferred exemplary embodiments thereof.

BRIEF DESCRIPTION OF THE DRAWINGS

Reference will be made to the accompanying drawings wherein like reference numerals through the various FIGURES denote like structural elements, and wherein.

DETAILED DESCRIPTION

The following description sets forth specific details, such as particular embodiments, procedures, techniques etc. for purposes of explanation and not limitation. It will however be appreciated by one skilled in the art that other embodiments may be employed apart from these specific details. In some instances, detailed descriptions of well known methods, material and devices are omitted so as not obscure the description with unnecessary detail. Individual blocks may be shown in some of the figures.

Figure 1:
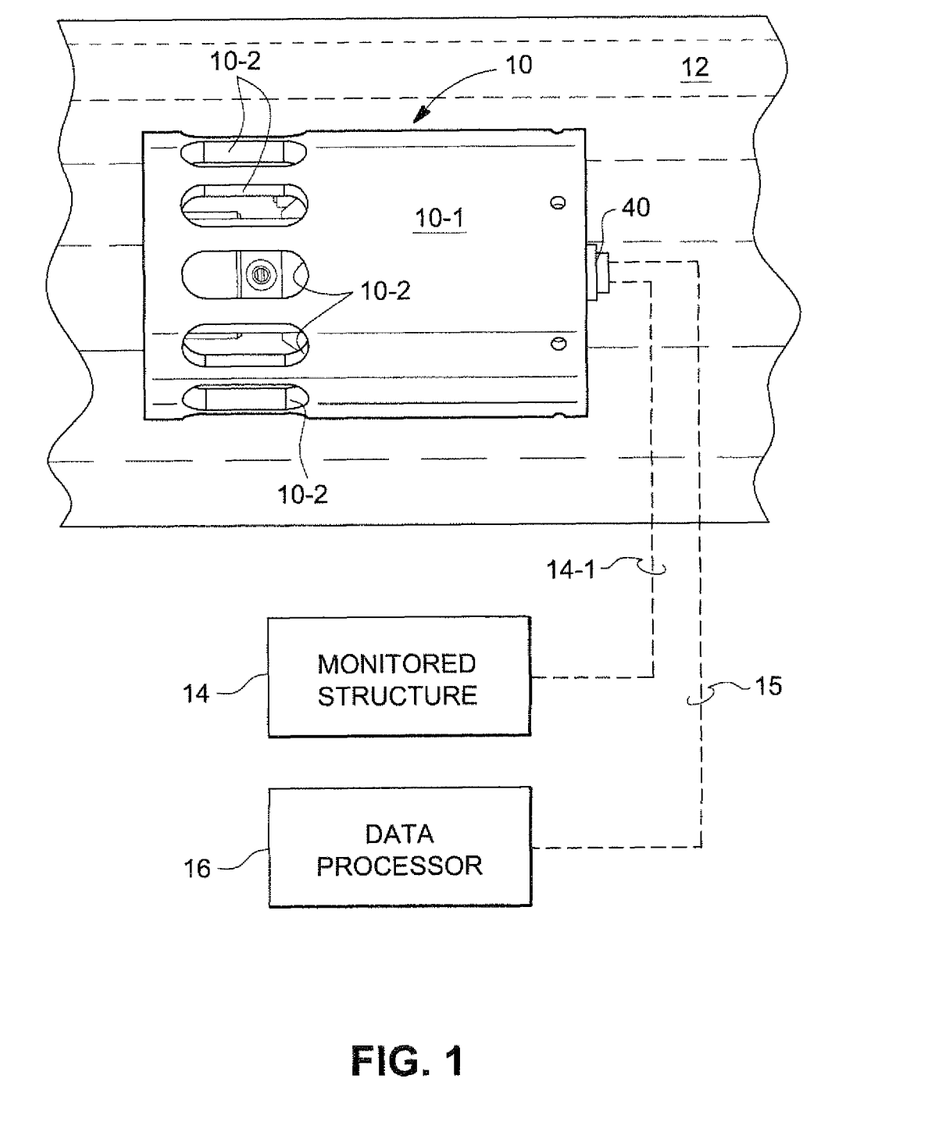
FIG. 1 is a schematic view of an EAC monitoring sensor assembly in accordance with a preferred embodiment of the present invention in an exemplary environment of use.

Accompanying FIG. 1 depicts schematically an EAC monitoring sensor assembly 10 in accordance with one presently preferred embodiment of the present invention in an exemplary environment of use. As can be seen, the sensor assembly 10 is positioned so as to be in fluid-communication with a fluid 12 which is in contact with a structural component associated with the desired monitored structure 14. The fluid 12 may be any environment liquid or gas that contacts the EAC monitoring sensor assembly 10. The assembly 10 includes a protective shroud 10-1 having a circumferentially disposed series of openings 10-2 to allow the fluid 12 to flow into the shroud 10-1 and communicate with its internal components to be discussed in greater detail below. Signal data indicative of the effect that the fluid 12 has on such internal components may be transferred via signal line 15 to a data processor 16 or like device. Signal transfer via signal line 15 may be accomplished by wired or wireless communications. Similarly, to ensure that the sensor components of the assembly and the monitored structure 14 are at the same electrochemical potential, an electrical connection may be established therebetween via line 14-1. The processor 16 thus presents a human-readable form of the data to show, for example, the extent of environment assisted cracking that may be occurring to the monitored structure by virtue of its contact with the fluid 12.

Figure 2:
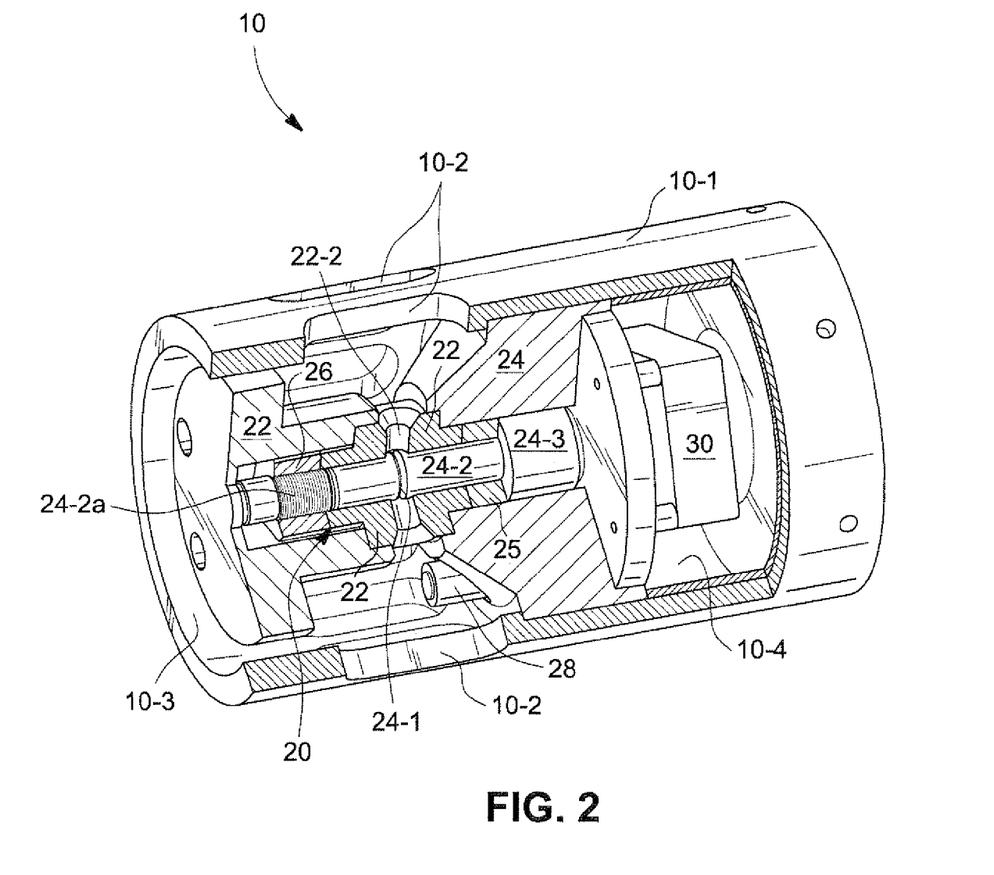
FIG. 2 is a perspective view partly in section of the EAC monitoring sensor assembly depicted in FIG. 1.
Figure 3:
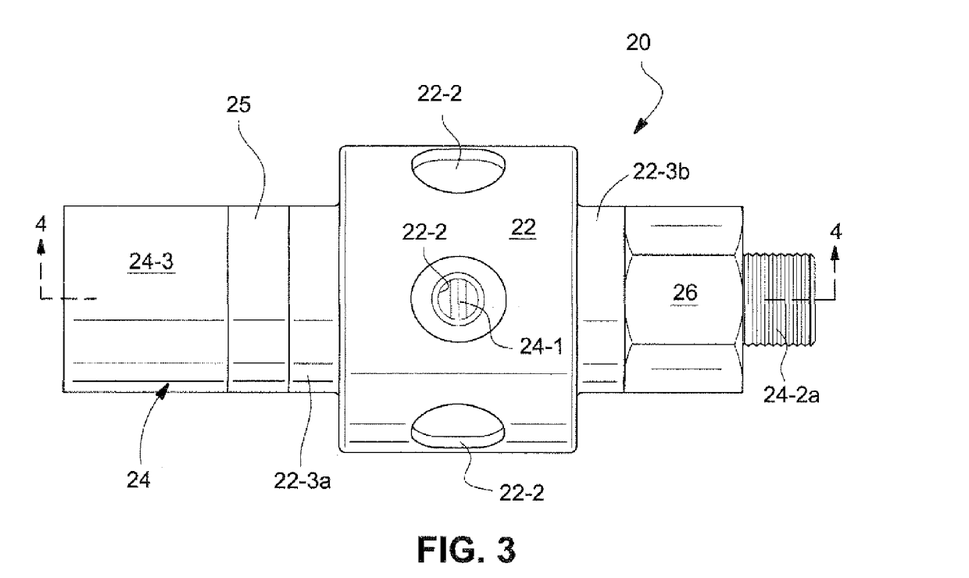
FIG. 3 is an enlarged side elevational view of a crack sensor unit employed in the EAC monitoring assembly depicted in FIG. 2.
Figure 4:
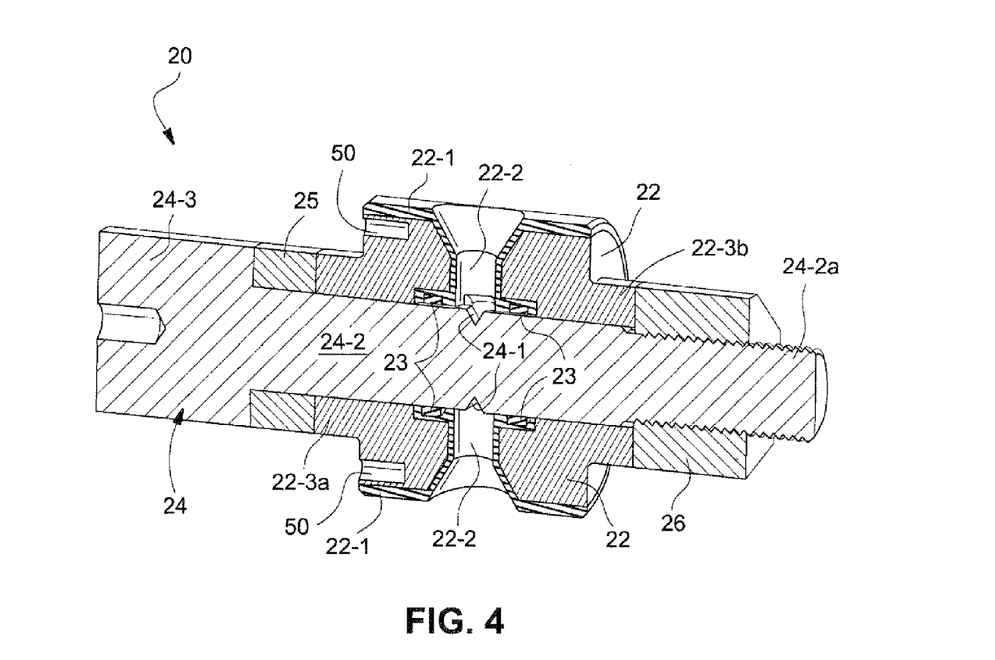
FIG. 4 is a cross-sectional view of the crack sensor unit shown in FIG. 3 taken along lines 4-4 therein.

The EAC monitoring sensor assembly 10 and its associated crack sensor unit 20 are shown in greater detail in accompanying FIGS. 2-4. As is shown, the shroud 10-1 of assembly 10 defines an interior space 10-3 containing the crack sensor unit 20, forward and rearward structural supports 22, 24 and the electronics package 30 containing the signal condition electronics and battery (not shown). The electronics package 30 is positioned within a fluid-tight chamber 10-4 within the interior of the shroud 10-1 and is connected to the data processor 16 via signal line 15 as was described previously. A reference electrode 28 (preferably a standard Ag/AgCl electrode) is positioned within the interior space 10-3 of the shroud 10-1 so as to be in contact with the fluid entering the shroud 10-1 via openings 10-2.

The on-board electronics package 30 acquires load cell, temperature, and electrochemical potential measurements from the respective transducers. The electronics package 30 translates these raw measurements into practical engineering units (e.g. force, crack depth, crack velocity). The user may stream cracking data in real-time or store the data on-board in non-volatile (i.e. flash) memory for subsequent download, the latter permitting standalone deployment.

As is shown in FIGS. 3-4, the crack sensor unit 20 includes a generally cylindrical load frame 22 having an electrically insulated coating 22-1 thereon. Preferably the insulated coating 22-1 is an epoxy casting applied over the exterior surface of the frame 22. The frame 22 includes a pair of outwardly protruding engagement end bosses 22-3a, 22-3b at each end thereof. The mechanical stiffness characteristics afforded by the protruding engagement end bosses 22-3a, 22-3b permits the load frame end faces to deflect in a very uniform manner under load, thereby maintaining a flat interfacing surface for load cell 25 and preload nut 26.

A tensile specimen bolt 24 is received coaxially within the frame 22. It will be appreciated by those skilled in the art that, given sufficient dimensional tolerancing on the mating components, this embodiment readily ensures that the sample is not subject to bending moments resulting from misalignment. The tensile specimen bolt 24 includes a circumferential notch 24-1 formed on a shank 24-2 thereof which is disposed in registry with the ports 22-2 of the frame 22. In such a manner, therefore, the fluid 12 will contact the specimen bolt 24 at the notch 24-1. A load cell 25 is sandwiched between end boss 22-3a of the frame 22 and the head 24-3 of the specimen bolt 24. The terminal end 24-2a of shank 24-2 is threaded and thereby threadably receives a preload nut 26. The nut 26 thus bears against the end boss 22-3b of the frame 22. As the nut 26 is tightened against the end boss 22-3b, a tensile stress will in turn be responsively exerted on the bolt 24. The magnitude of the tensile stress will thus be sensed by the load cell 25 and be communicated thereby to the electronics package 30. Any change in the pre-loaded stress indicative of cracking of the bolt 24 in the vicinity of the notch 24-1 thereof will thus be sensed by the load cell 25 and communicated via signal line 15 to the data processor 16. Since the material of the bolt 24 is a surrogate for components of interest associated with the monitored structure 14, this sensed cracking of the bolt 24 in the vicinity of the notch 24-1 will thereby be indicative of environment assisted cracking of such components. In such a manner, therefore, the sensor unit 20 serves as a small scale model of structural cracking occurring on a larger scale with the components of interest associated with the monitored structure 14.

O-ring seals 23 are provided to seal the bolt 24 from the fluid entering via ports 22-2 except for the exposed notch 24-1 thereof. The O-ring seals 23 and the insulated coating 22-1 serve to isolate all metal surfaces except for the notch 24-1 of the specimen bolt 24 from the fluid (e.g. seawater) entering the ports 22-2 once the sensor unit 20 is sealed within the overall assembly 10. This sealing arrangement prevents undue EAC within the frame 22 and also avoids galvanic coupling problems if the frame 22 and sample bolt 24 are formed of disparate materials. For applications in which o-rings would not be desirable from a crevice corrosion standpoint, alternate sealing arrangements are possible (e.g. RTV sealant).

The tensile specimen bolt 24 is most preferably formed of a surrogate alloy with respect to the monitored structure 14. The preload stress intensity ($K_I$) generated at the root of the notch 24-1 is sufficient to initiate and propagate cracks in the bolt 24 under embrittling conditions ($K_I > K_{I,\,EAC}$), but is low enough to delay ductile overload failure ($K_I < K_{IC}$) until after a usable crack depth range has been used. As cracks initiate and grow in the sample bolt 24, its mechanical compliance increases, thereby relieving some of the initial preload. The embedded load cell 25 thus continuously monitors the tensile load of the sample bolt 24 and transmits such tensile load data to the data processor 16. A microcontroller associated with the data processor 16 or within the electronics package 30 compares the current load to the initial load and calculates the current crack depth based on calibration curves relating load shedding to crack depth. This real-time crack depth monitoring system may therefore provide vital information for three objectives: 1) maintaining proper cathodic protection system parameters, 2) establishing safe inspection intervals based on potential crack growth in a specific environment, and 3) obtaining fracture properties for new and existing alloys in real-world environments, which is not possible with traditional test methods requiring bulky and expensive hardware.

The tensile sample bolt 24 is ideally fabricated from the same alloy as the components of interest associated with the monitored structure 14, or in the case of laboratory studies, whichever alloy is of interest to the researcher. The load frame 22 and preload nut 26 may be fabricated of any material, but preferably using a material with high elastic modulus and similar thermal expansion properties as the tensile sample bolt 22 to reduce the sensitivity to changes in environmental temperature. The load cell 25 according to preferred embodiments can be any unit commercially available and intended for long-term monitoring of bolt preload and is therefore exceptionally stable over long periods of time and ideally used for this application. One preferred unit that may be employed for the load cell 25 is the Model LWO-25 commercially available from Transducer Techniques, Inc. of Temecula, Calif.

During assembly, the tensile sample bolt 24 is loaded to a predetermined stress value to produce the desired mode-I stress intensity ($K_I$) in the root of notch 24-1. Preload stress is applied using a hydraulic fixture that effectively compresses the frame 22 and tensions the sample bolt 24. The preload nut 26 is then tightened by hand to lock in the preload stress once the hydraulic pressure is removed. The hydraulic-assisted preload method reduces undesirable torsional stresses in the sample since the required torque on the nut is low compared to the case without hydraulic assistance where high tightening torques are required to achieve the necessary preload. Furthermore, the hydraulic fixture provides a convenient approach for verifying the factory force calibration of the units employed as the compression load cell 25.

To ensure that the crack sensor unit 20 is at the same electrochemical potential (i.e. propensity for hydrogen embrittlement) as the monitored structure 14, an electrical connection is made via line 14-1 between the tensile sample bolt 24 and the monitored structure 14. The cathodic protection system or anode arrangement (not shown) associated with the monitored structure 14 then polarizes the sample bolt 24 to the same potential as the exposed areas of the structure 14. In the case of a laboratory test under potentiostatic control, the tensile sample bolt 24 becomes the working electrode (WE). Under conditions where the hydrogen evolution reaction is possible, the sample bolt 24 suffers EAC and crack initiation and growth are monitored.

The embedded electronics package 30 preferably provides several key functions, notably: (1) signal conditioning and digitization of the data from load cell 25, embedded temperature sensor, and reference electrode 28, (2) crack depth calculation including temperature compensation, (3) long-term data storage, and/or (4) communication with an external device (e.g., the data processor 16 or other display/monitoring systems) in order to download data from the sensor (e.g. during maintenance cycles). The electrochemical reference potential as measured with the on-board reference electrode 28 helps corroborate EAC indications provided by the crack detection load cell transducer 25.

The electronics package 30 may be powered over the serial communications bus (e.g. RS485), or for long-term remote testing, powered by batteries housed within the sensor assembly 10. A hermetically sealed submersible electrical connector 40 (see FIG. 1) provides the electrical interface to the sensor electronics package 30, permitting fully-submerged operation without risk of water ingress at the connection.

In use, cracks growing within the sensor sample bolt 24 decreases its mechanical rigidity, resulting in a drop in the preload stress of the bolt 24 from its initial value that is detected by high resolution force instrumentation. Below is a discussion which outlines the analytical formulation describing the effective load drop with crack growth and how the force measurement is converted to the more practical crack depth indication via algorithms that may be employed by the electronics package 30 or by the data processor 16.

Of the four primary load-bearing components of the crack sensor unit 20, the sample bolt 24 is in tension while the remainder of the component parts (e.g., the frame 22, nut 26 and load cell 25) are necessarily in compression. If $k_f$ is the effective combined stiffness of the load frame 22, nut 26, and load cell 25, whose value is assumed to be constant with time, and the tensile sample stiffness, $k_s$, is a function of crack depth (a), then the overall assembly stiffness, k, as the series-combined $k_f$ and $k_s$ stiffnesses can be represented by the following Equation 1:

$$k(a) = \frac{k_f k_s(a)}{k_f + k_s(a)} \qquad \text{(Equation 1)}$$

This expression in turn permits the straightforward expression relating applied force, F, to the resulting deflection, x as per Equation 2 below:

$$F(a) = k(a) \cdot x \qquad \text{(Equation 2)}$$

It will be understood that both the sample bolt 24 and load frame 22 experience equal force, F, but of opposite sign. Practically speaking, the deflection under load, $x_1$ may be envisioned as the distance the preload nut 26 is advanced up the sample bolt threads at its threaded end 24-2a relative to the unloaded condition. The deflection, x, therefore represents the effective preload strain imparted to the assembly.

Upon initial assembly when the sample is not yet cracked (i.e. a=0), the preload force F(0) is set to provide the desired stress intensity in the root of the sample notch 24-1 to ensure cracking under HE conditions. This initial load applied to the effective stiffness with no cracking, k(0) produces a total deflection, x, in the component assembly. Importantly, this total deflection remains constant throughout the life of the sensor unit 20. This is a reasonable assumption as there is no reason to expect the total deflection to change unless the nut 26 is loosened or tightened, other than long term creep and thermal strains that are discussed subsequently.

If displacement is defined as a constant value, then it is straightforward to determine the relative change in effective stiffness by monitoring the relative change in the force, as compared to the initial states noted by Equation 3:

$$\frac{k(a)}{k(0)} = \frac{F(a)}{F(0)} \qquad \text{(Equation 3)}$$

From this expression, it is clear that the crack depth may be inferred from the present and initial forces if the relationship between tensile sample crack depth and stiffness were known. For example, if the measured load indicated a 25% reduction in preload force relative to the initial state, one would simply determine at what crack depth the overall stiffness had been reduced by the same percentage.

The characteristic sample stiffness vs. crack depth curve is developed by measuring sample deflection at a given load over a range of crack depths. This study may be performed empirically using a mechanical loading machine (e.g. Instron, MTS) to characterize the actual sample stiffness for several crack depths, or numerically using finite element analysis (FEA) to simulate the same arrangement.

Figure 5:
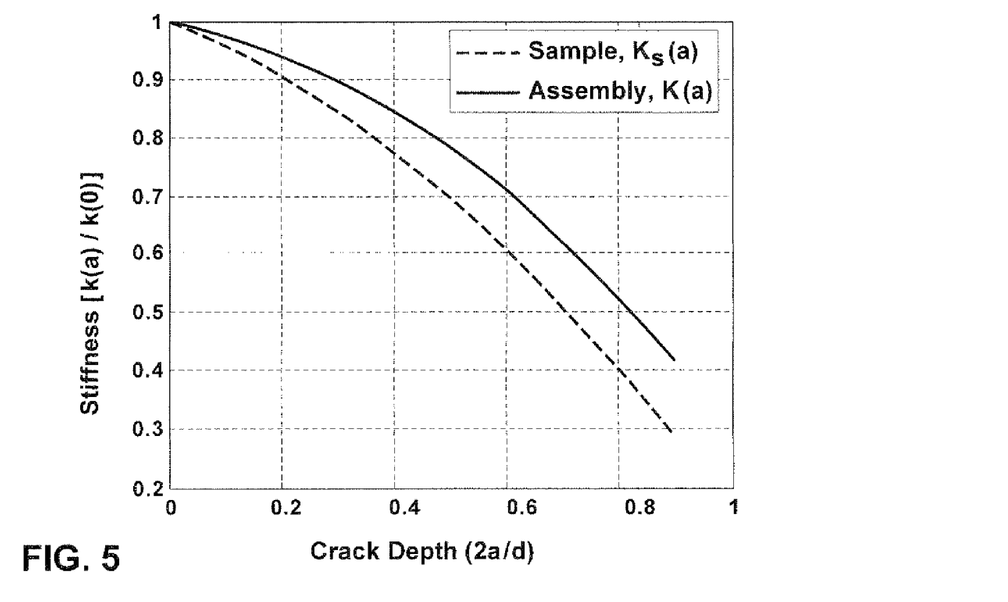
FIG. 5 is a calibration curve for the EAC monitoring sensor assembly relating measured load to nominal crack depth.

The stiffness vs. crack depth relationship presented in FIG. 5 was developed using a FEA, where the stiffness has been normalized against the initial value, and crack depth normalized against the uncracked ligament diameter, d. The crack is assumed to propagate radially, with uniform depth around the circumference (i.e. concentric). Using Equation 1, the sample stiffness ($k_s$), was then corrected for the effects of frame compliance ($k_f$) to produce the assembly stiffness curve (k). The corrected assembly stiffness curve is utilized in the on-board microprocessor to translate measured force (viz. stiffness) into a practical crack depth metric. This curve may be further refined using empirical measurements of the actual assembly stiffness during the sensor force calibration procedure.

Thermal effects must be mitigated to ensure the best possible crack depth resolution. Uncompensated, thermal sensitivities are sufficient to create significant error in the crack depth calculation over small temperature changes (typically 0.01-0.03 mm/° C.). Temperature influences the EAC detection crack sensor unit 20 through two primary modes. First, the load cell 25 and instrumentation package 30 have inherent thermal sensitivities that affect the measurement span and offset, causing an error between the actual and measured applied loads. Second, differential thermal expansion between the frame 22 and sample bolt 24 affect the actual applied force much in the same way as loosening or tightening the preload nut 26—a consequence of the intentionally stiff mechanical assembly. The latter effect can be minimized by using materials to construct the frame 22 and bolt 24 with similar thermal expansion characteristics (i.e. the same material). In cases where this is not practical, such as reusing old sensor frames for a new alloy, this effect must be characterized and compensated.

In a preferred sensor embodiment, temperature is measured using a thermally sensitive element (e.g. RTD) that may be embedded directly within the load frame 22 by recesses 50 shown in FIG. 4. The sensor response is characterized over a range of temperature at several applied loads to characterize the thermal sensitivity. Unloaded without the preload nut 26, the observed sensitivity is limited to the load cell 25 and electronics package 30, as differential strain can produce no additional load. Once the preload nut 26 is applied, the resulting thermal response is the combined effect of instrumentation and differential thermal expansion effects. Given both the unloaded and combined response, the response to differential thermal expansion alone may be extracted.

The crack depth calculation is compensated for the effect of temperature by first correcting the measured force (load cell and instrumentation output), then applying a correction factor for the estimated level of differential thermal expansion at the measured temperature.

The present invention will be further understood from the following non-limiting experimental testing.

Experimental Test 1

Figure 6:
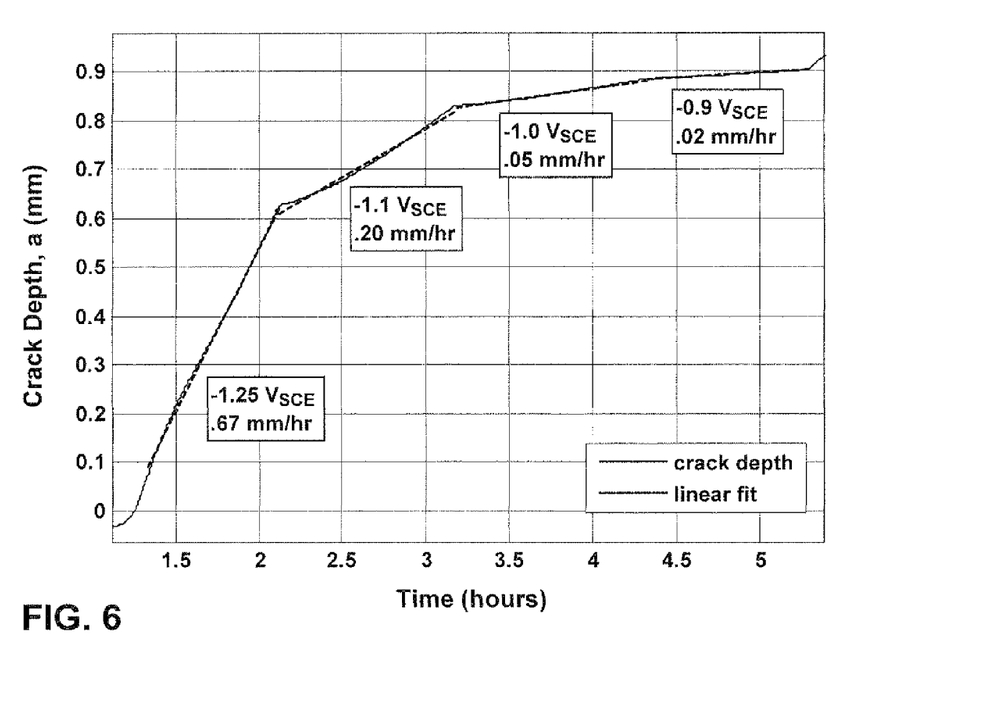
FIG. 6 is a plot of the experimental results showing crack depth versus time at various applied potentials.

Testing was performed to characterize the sensor's real-time crack depth measurement performance. A 17-4PH stainless steel (H900) tensile sample with an untracked ligament diameter (d) of 10.2 mm [0.400 in] was loaded to a stress intensity of approximately 30 MPa $(m^{0.5})$, immersed in 0.6 M NaCl solution and subjected to a range of applied cathodic potentials. Data was acquired by initiating a crack at −1.25 V relative to a standard calomel electrode (SCE) and stepping the potential to higher (less negative) values at one hour intervals. The measured crack depth time history is depicted in FIG. 6, and the approximated crack growth rates plotted against the electrochemical potential in FIG. 7.

Figure 7:
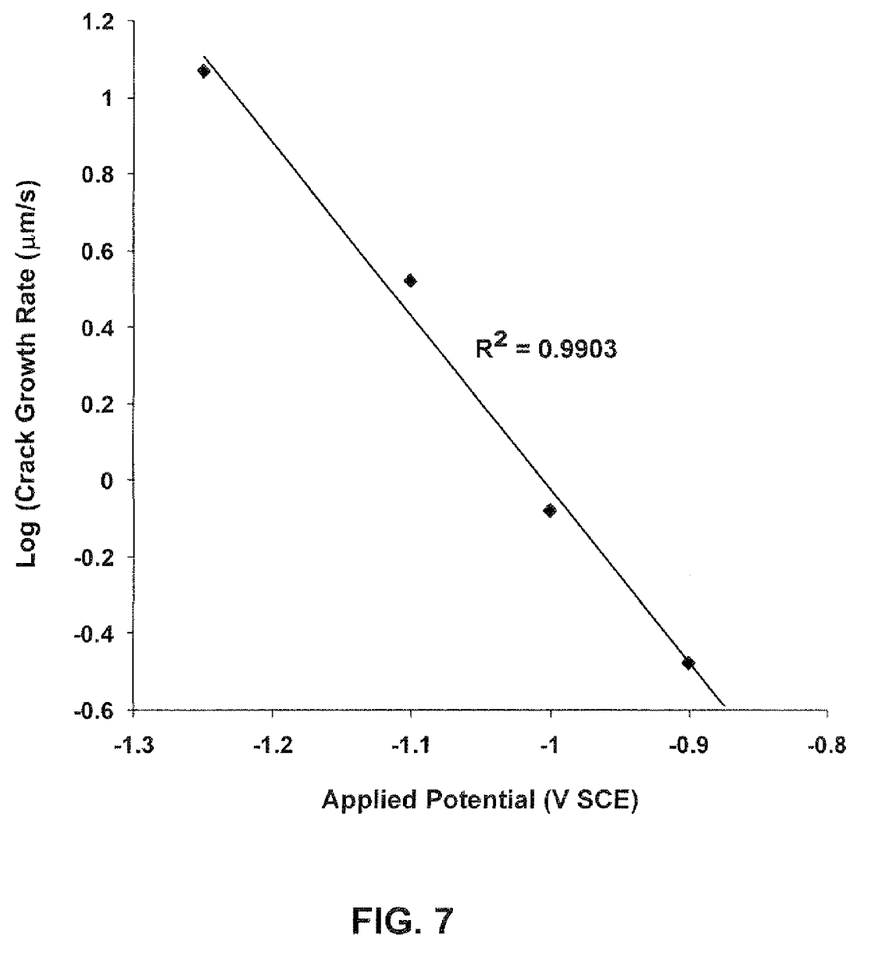
FIG. 7 is a plot of the experimental results showing crack growth rate as a function of applied electrochemical potential.

The linearity of the plot of FIG. 7 suggests that the crack growth rate is dependent on the kinetics of the hydrogen evolution reaction at the crack tip which is a function of the log of potential. Note that even at potentials as high as −0.9 V SCE the crack continues to grow. In other experiments at lower $K_I$ values, it has also been shown that the crack was completely arrested at potentials greater than about −1.1 V SCE. These findings are consistent with data previously developed by C. T. Fujii, *Stress Corrosion Cracking—New Approaches*, ASTM STP 610, ASTM, Philadelphia, Pa., pp. 213-225, (1976). For higher values of $K_I$, the potential required for crack growth is less negative.

Experimental Test 2

The real-time crack measurement capability of the EAC crack sensor unit 20 has also been demonstrated using Monel K500, a high-strength alloy that is widely employed in marine environments for high stress applications (e.g. bolting, shafting). While nominally exhibiting high toughness, this material has proven to be susceptible to the effects of hydrogen embrittlement resulting in the failure of critical marine structures.

Figure 8:
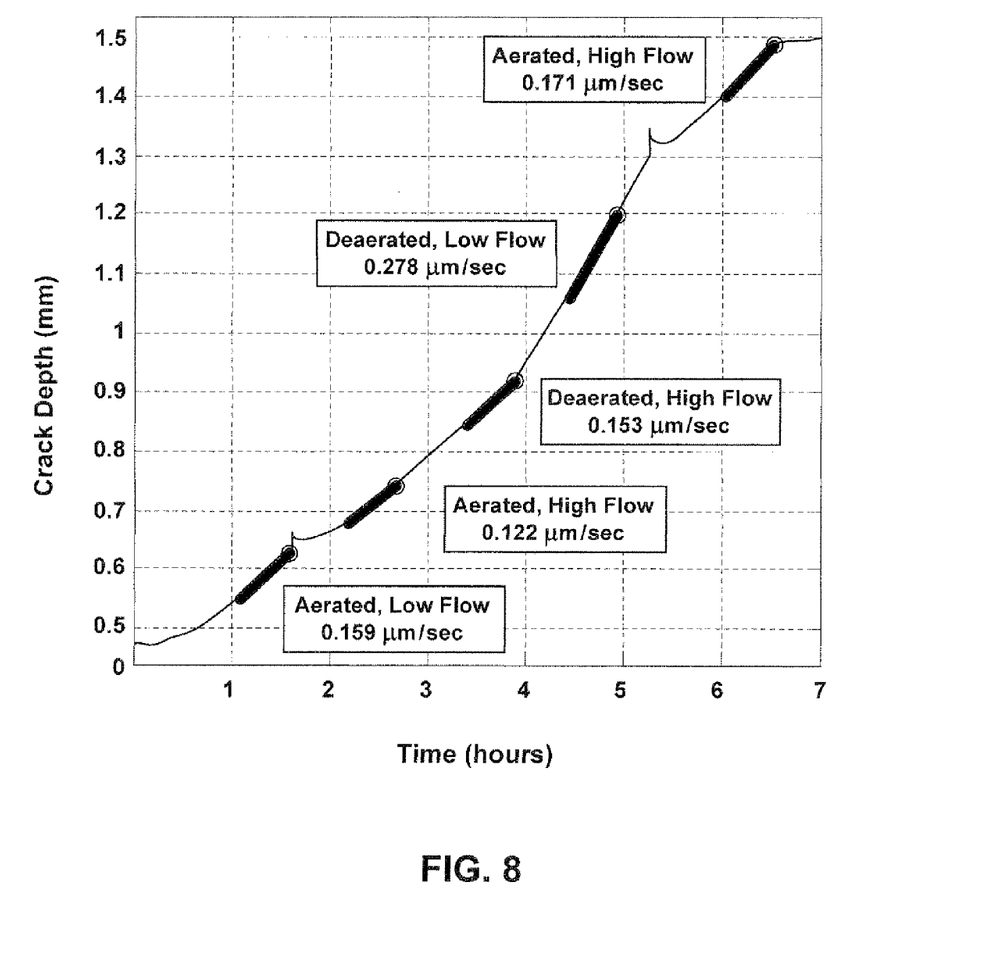
FIG. 8 is a graph of the experimental results showing crack depth versus time at various aerated and deaerated fluid flow rates.

Direct-aged K500 material (HRc 35) was loaded to an initial stress intensity of 33 MPa $(m^{0.5})$ and subjected to a cathodic potential of −1.27 V (Ag/AgCl). FIG. 8 illustrates the resulting crack depth time history across several operating conditions where the fluid aeration and flow rate were varied in order to ascertain their effect on the crack propagation velocity. The circles indicate times at which conditions were changed. It is notable that the sensor responds within minutes to changing conditions, especially considering the low hydrogen diffusivity of this nickel-based alloy.

What is claimed is:

1. A sensor unit which provides surrogate determination of crack development within a component of interest associated with a monitored structure comprising:
    sample sensor bolt having a shank with a head at one end, a threaded end opposite to the head and an exposed portion between the head and threaded end, wherein at least the shank of the sensor bolt is formed of a material serving as a surrogate of the material forming the component of interest associated with the monitored structure;
    a frame surrounding the shank of the sensor bolt and having fluid ports therein, wherein the exposed portion of the sensor bolt shank is positioned in registry with the fluid ports such that fluid entering the fluid ports comes into contact with the exposed portion of the sensor bolt shank in registry therewith;
    a pre-load nut threaded onto the threaded end of the sensor bolt shank and contacting an end of the frame so as to place the sensor bolt shank under an initial tensile stress, and
    a load cell operatively connected to the sensor bolt for sensing relief of the initial tensile stress of the sensor bolt shank; wherein
    fluid entering the fluid ports of the frame comes into contact with the exposed portion of the sensor bolt shank so as to cause crack formation therewithin, wherein the crack formation within the sensor bolt shank caused by fluid acting upon the exposed portion thereof responsively relieves the initial tensile stress of the sensor bolt which tensile stress relief is thereby sensed by the load cell to allow crack development in the sensor bolt shank to be determined and correlated to crack development occurring within the component of interest associated with the monitored structure.

2. A sensor unit as in claim 1, wherein the exposed portion of the sensor bolt shank includes a circumferential notch which is in registry with the fluid ports of the frame.

3. A sensor unit as in claim 1, wherein the frame includes an electrically insulative coating.

4. A sensor unit as in claim 1, wherein the frame includes a thermally sensitive element.

5. A sensor unit as in claim 1, wherein the frame is generally cylindrical, and wherein the sensor bolt is coaxially received by the frame.

6. A sensor unit as in claim 1, wherein the frame includes protruding engagement end bosses at each end thereof to produce uniform frame deflection characteristics.

7. A sensor unit as in claim 6, wherein the load cell is sandwiched between the head of the sensor bolt and an opposed one of the engagement end bosses of the frame.

8. A sensor unit as in claim 7, wherein the preload nut contacts an opposite one of the engagement end bosses.

9. A sensor assembly comprising:
    a shroud defining an interior space and having an opening therein to allow fluid to enter the interior space from an exterior thereof;
    an electrically isolated sensor unit positioned within the interior space of the shroud; and
    an electronics package connected operatively to the sensor unit for generating signal data representative of crack formation developed in the monitored structure, wherein the sensor unit comprises:
    (i) sample sensor bolt having a shank with a head at one end, a threaded end opposite to the head, and an exposed portion between the head and threaded end;

(ii) a frame surrounding the shank of the sensor bolt and having fluid ports therein, wherein the exposed portion of the sensor bolt shank is positioned in registry with the fluid ports such that fluid entering the fluid ports comes into contact with the exposed portion of the sensor bolt shank in registry therewith;

(iii) a pre-load nut threaded onto the threaded end of the sensor bolt shank and contacting an end of the frame so as to place the sensor bolt under an initial tensile stress, and (iv) a load cell operatively connected to the sensor bolt for sensing relief of the initial tensile stress of the sensor bolt shank which is indicative of crack formation therewithin, wherein crack formation within the sensor bolt shank caused by fluid acting upon the exposed portion thereof responsively relieves the initial tensile force of the sensor bolt which tensile stress relief is thereby sensed by the load cell.

10. A sensor assembly as in claim 9, wherein the exposed portion of the sensor bolt shank includes a circumferential notch which is in registry with the fluid ports of the frame.

11. A sensor assembly as in claim 9, wherein the frame includes an electrically insulative coating.

12. A sensor assembly as in claim 9, wherein the frame includes a thermally sensitive element.

13. A sensor assembly as in claim 9, wherein the frame is generally cylindrical, and wherein the sensor bolt is coaxially received by the frame.

14. A sensor assembly as in claim 9, wherein the frame includes protruding engagement end bosses at each end thereof.

15. A sensor assembly as in claim 14, wherein the load cell is sandwiched between the head of the sensor bolt and an opposed one of the engagement end bosses of the frame.

16. A sensor assembly as in claim 15, wherein the preload nut contacts an opposite one of the engagement end bosses.

17. A sensor assembly as in claim 9, further comprising a data processor operatively connected to the electronics package for receiving the signal data generated thereby.

18. A sensor assembly as in claim 9, further comprising an electrochemical reference electrode positioned within the interior space of the shroud so as to be exposed to the fluid therein.

19. A method of determining crack development of a monitored structure comprising:

(a) positioning a sensor assembly as in claim 9 in a fluid which contacts a component of interest associated with a monitored structure;

(b) establishing an electrical connection between the sensor unit and the monitored structure so that the sensor unit and the monitored structure are at the same electrochemical potential; and (c) monitoring data signals generated by the sensor unit to determine crack formation within the sensor bolt shank by virtue of the tensile stress relief sensed by the load cell; and (d) correlating the determined crack formation within the sensor bolt shank from the data signals generated by the sensor unit to a propensity for crack development within the component of interest associated with the monitored structure.

20. The method as in claim 19, wherein the monitored structure is a marine vessel.

* * * * *